United States Patent
Kim et al.

(10) Patent No.: US 7,161,917 B2
(45) Date of Patent: Jan. 9, 2007

(54) METHOD OF ALLOCATING CHANNEL CODES FOR A SYNCHRONOUS UPLINK OF MOBILE COMMUNICATION SYSTEM

(75) Inventors: Duk Kyung Kim, Seocho-gu (KR); Sang Yun Lee, Kyunggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 848 days.

(21) Appl. No.: 09/984,981

(22) Filed: Oct. 31, 2001

(65) Prior Publication Data

US 2002/0068547 A1 Jun. 6, 2002

(30) Foreign Application Priority Data

Nov. 20, 2000 (KR) ............... 2000-69110

(51) Int. Cl.
*H04B 7/216* (2006.01)
(52) U.S. Cl. ............... 370/335; 370/342; 375/145
(58) Field of Classification Search .......... 370/208, 370/335, 342; 375/145, 149
See application file for complete search history.

(56) References Cited

U.S. PATENT DOCUMENTS

| | | | | |
|---|---|---|---|---|
| 5,751,761 A | * | 5/1998 | Gilhousen | 375/146 |
| 6,023,462 A | * | 2/2000 | Nieczyporowicz et al. | 370/335 |
| 6,163,524 A | * | 12/2000 | Magnusson et al. | 370/208 |
| 6,560,194 B1 | * | 5/2003 | Gourgue et al. | 370/203 |
| 6,636,496 B1 | * | 10/2003 | Cho et al. | 370/335 |

* cited by examiner

*Primary Examiner*—Chau Nguyen
*Assistant Examiner*—Christopher Grey
(74) *Attorney, Agent, or Firm*—Rothwell, Figg, Earnst & Manbeck

(57) ABSTRACT

The present invention relates to a method of allocating channel codes for synchronous uplinks in a mobile communication system using a plurality of scrambling codes for the uplinks. This channel code allocating method, when a call is requested, searches for scrambling codes having at least one unused channel code, selects a foremost scrambling code among the found scrambling codes, and allocates an unused channel code in the selected scrambling code to the requested call, and, when a call is released, checks the number of channel codes and a scrambling code used by the released call, searches for active calls using another scrambling code posterior to the scrambling code the released call has used and not more channel codes than the number of the channel codes the released call has used, and re-allocates the channel codes and the scrambling code used by the released call to at least one active call if found. This method makes full use of channel codes in one scrambling code, as possible as it can, before using ones in next scrambling code, therefore orthogonality between channels which reduces interferences between channels is remarkably enhanced.

5 Claims, 2 Drawing Sheets

METHOD OF ALLOCATING CHANNEL CODES FOR A SYNCHRONOUS UPLINK OF MOBILE COMMUNICATION SYSTEM

BACKGROUND OF THE INVENTION

1. Field of the Invention

The present invention relates to a method of allocating channel codes for synchronous uplinks in a mobile communication system using a plurality of scrambling codes for the uplinks.

2. Description of the Related Art

In CDMA mobile communication system, there are downlink and uplink between mobile stations and a base station where a downlink is a data path from a base station to mobile stations and an uplink is for reverse direction.

In a cell of a base station, a plurality of channels of a downlink are synchronized between the base station and many mobile stations, so that interferences between channels arise little in decoding with mutually orthogonal codes for each channel.

However, channels of an uplink are asynchronous each other since mobile stations are located in different sites in a cell, so that orthogonality between channels can not be used. This inherent problem causes interferences between uplink channels. Furthermore, such interferences are increased in proportion to increment of uplink channels, namely, active mobile stations, therefore, the capacity of an uplink is inevitably limited.

To increase the capacity of an uplink, it is needed to synchronize uplink channels by adjusting transmitting time of each mobile station. If uplink channels are synchronized each other, it is possible to minimize interferences between uplink channels with mutually orthogonal codes. A related technology is USTS (Uplink Synchronous Transmission Scheme).

The USTS technology is for increasing capacity of an uplink by guaranteeing orthogonality between uplink channels. In CDMA (Code Division Multiple Access) mobile communication system, as aforementioned, it has no benefit to use mutually orthogonal codes for an uplink from mobile stations to a base station because channels of the uplink are not synchronized, whereas it has great benefit to use mutually orthogonal codes for a downlink because all channels of a downlink are synchronized. Therefore, the capacity of a CDMA system is totally dependent on the uplink capacity which is restricted by interferences between uplink channels proportional to the number of active mobile stations.

The USTS technology, which aims at synchronizing uplink channels to resolve such problems of CDMA mobile system, distinguishes mobile stations, namely uplink channels with mutually orthogonal channel codes while conventional method distinguishes mobile stations with different scrambling codes. Since channel codes are used for differentiation of channels, channel codes of one scrambling code may be insufficient, therefore several scrambling codes may be used in a cell of a base station to produce more channel codes. If multiple scrambling codes are used, it is necessary to develop a new method for allocating channel codes which can maximize CDMA system capacity.

SUMMARY OF THE INVENTION

It is an object of the present invention to provide a method of allocating channel codes for each call so that scrambling codes may be used fewer as possible as they can in order to enhance capacity of resources in a base station of CDMA mobile communication system which synchronizes uplink channels and uses a plurality of scrambling codes and a plurality of channel codes, which are allocated for each mobile station, for each scrambling code.

A method of allocating channel codes of a plurality of scrambling codes in synchronous uplink scheme of mobile communication system in accordance with the present invention, searches for scrambling codes having at least one unused channel code if a call originated from a mobile station or handed-off from another base station is requested, selects a foremost scrambling code among the found scrambling codes, and allocates an unused channel code in the selected scrambling code to the requested call.

Another method of allocating channel codes of a plurality of scrambling codes in synchronous uplink scheme of mobile communication system in accordance with the present invention, checks the number of channel codes and a scrambling code used by a call released due to termination or hand-off to another base station, searches for other active calls using another scrambling code posterior to the scrambling code the released call has used and not more channel codes than the number of the channel codes the released call has used, and re-allocates the channel codes and the scrambling code used by the released call to at least one active call if found.

According to the above channel code allocating method of the present invention, when a call is requested or released, unused channel codes in the most preceding scrambling code or a scrambling code the released call has used are allocated or re-allocated before anything else as possible as they can be.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENT

Figure 1:
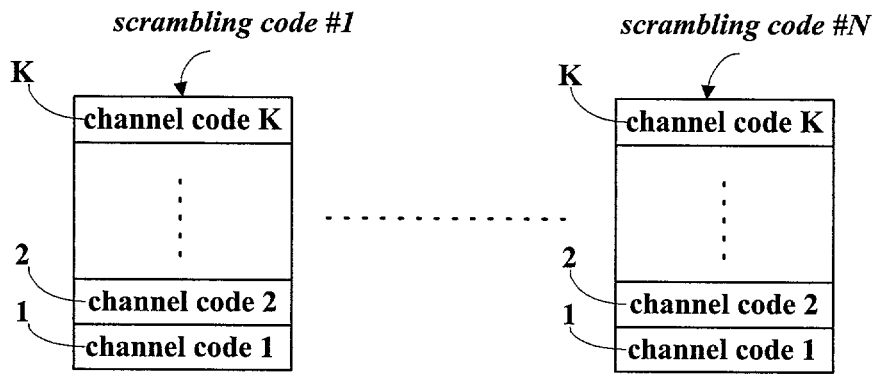
FIG. 1 shows a configuration of channel codes and scrambling codes and their relation.

In order that the invention may be fully understood, a preferred embodiment thereof will now be described with reference to the accompanying drawings.

Before explaining an embodiment of the present invention, the USTS technology is described in brief at first.

The USTS secures orthogonality between uplink channels with adjustment of transmitting time of each mobile station within a cell of a base station based on a reference time.

A mobile station in a cell of a base station requests a call through an uplink channel, then, the base station measures round trip propagation delay of a signal and measures a time offset between the reference time and starting time of a frame from the mobile station requesting a call based on the measured delay. In case that a call terminates at a mobile station, the time offset is also measured for the call-terminating mobile station.

The measured time offset is sent to the call-originating or call-terminating mobile station through a control channel of a downlink. Then, the mobile station adjusts its frame transmitting time to synchronize its frame arriving time with the reference time of the base station. The adjustment of frame transmitting time is conducted while talking over the mobile station since the time offset measured periodically is continuously provided for the mobile station. Therefore, every frame from the mobile station is arrived at the base station in synchronization with the reference time.

Other mobile stations within the cell are notified of each time offset from the base station as explained above, so that they adjust their frame transmitting time too in order that their frames may be arrived at the reference time of the base station.

A base station and a mobile station use both scrambling code and channel code which is to discriminate mobile stations and channels. Interferences between uplink channels of mobile stations using same scrambling code can be eliminated by orthogonality of channel codes of each mobile station if each frame arriving time is synchronized with the reference time.

Since the number of channel codes is limited within one scrambling code, it might happen that channel codes are insufficient if only one scrambling code is used. Therefore, more than one scrambling code should be used within a one cell to overcome such a shortage of channel codes. However, since there is no orthogonality between channels using different scrambling codes it is impossible to enjoy advantage of USTS. Accordingly, a new method of allocating channel code in accordance with this invention, which will be described in detail, is necessary for maximizing the capacity of CDMA communication system if multiple scrambling codes are used.

In the condition that a base station covering a cell uses N scrambling codes, a mobile station supporting USTS receives a scrambling code and one or more channel codes to use in communication from the base station. The N scrambling codes may be evenly assigned to mobile stations, or one scrambling code may be fully used and then next codes are used in turn. A channel code allocating method according to the present invention uses the latter method to maximize interference eliminating effect attained from orthogonality between channels, and it is applied to hand-off and call terminating procedure as well as originating call processing procedure to obtain much greater effect.

A preferred embodiment according to the present invention is described below in detail.

FIG. 1 shows an exemplary configuration of channel codes and scrambling codes and their relation. As given in FIG. 1, a base station uses N scrambling codes where K channel codes can be assigned in each scrambling code. The order of placing scrambling and channel codes has no special meaning.

Figure 2:
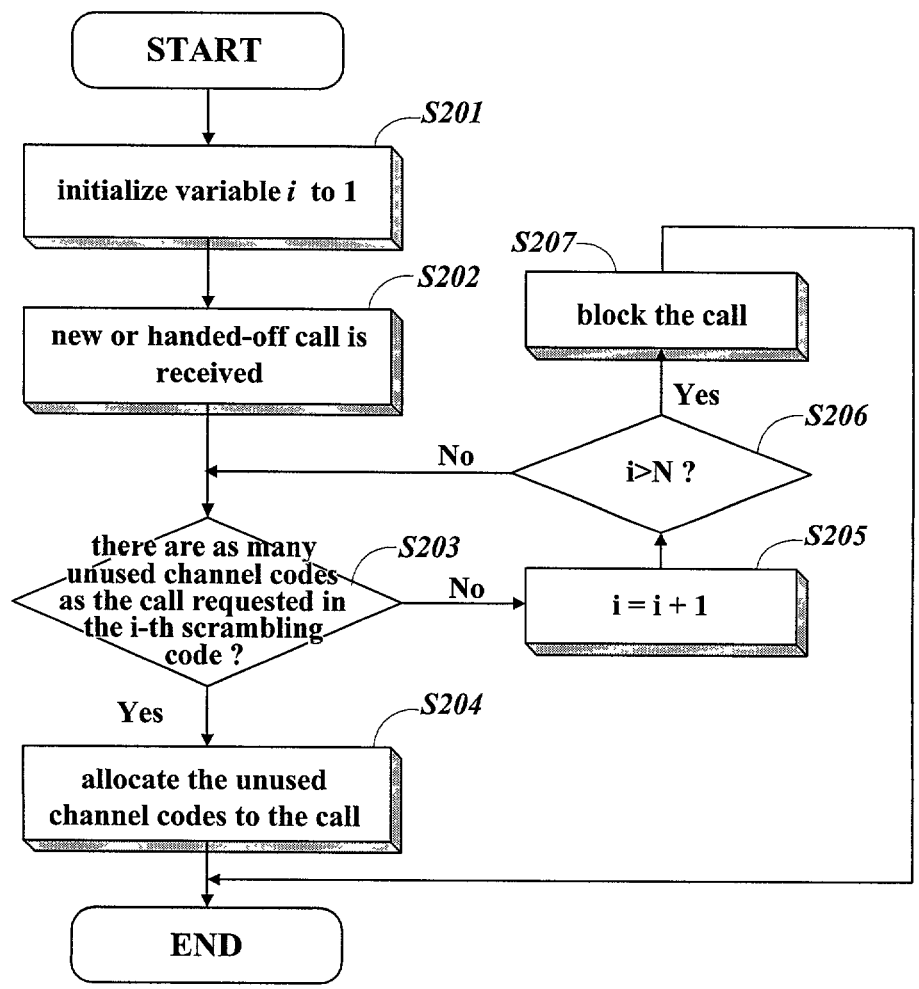
FIG. 2 is a flow chart embodying a channel code allocating method, which is for a call originated from a mobile station or a hand-off call from another base station, according to the present invention.
Figure 3:
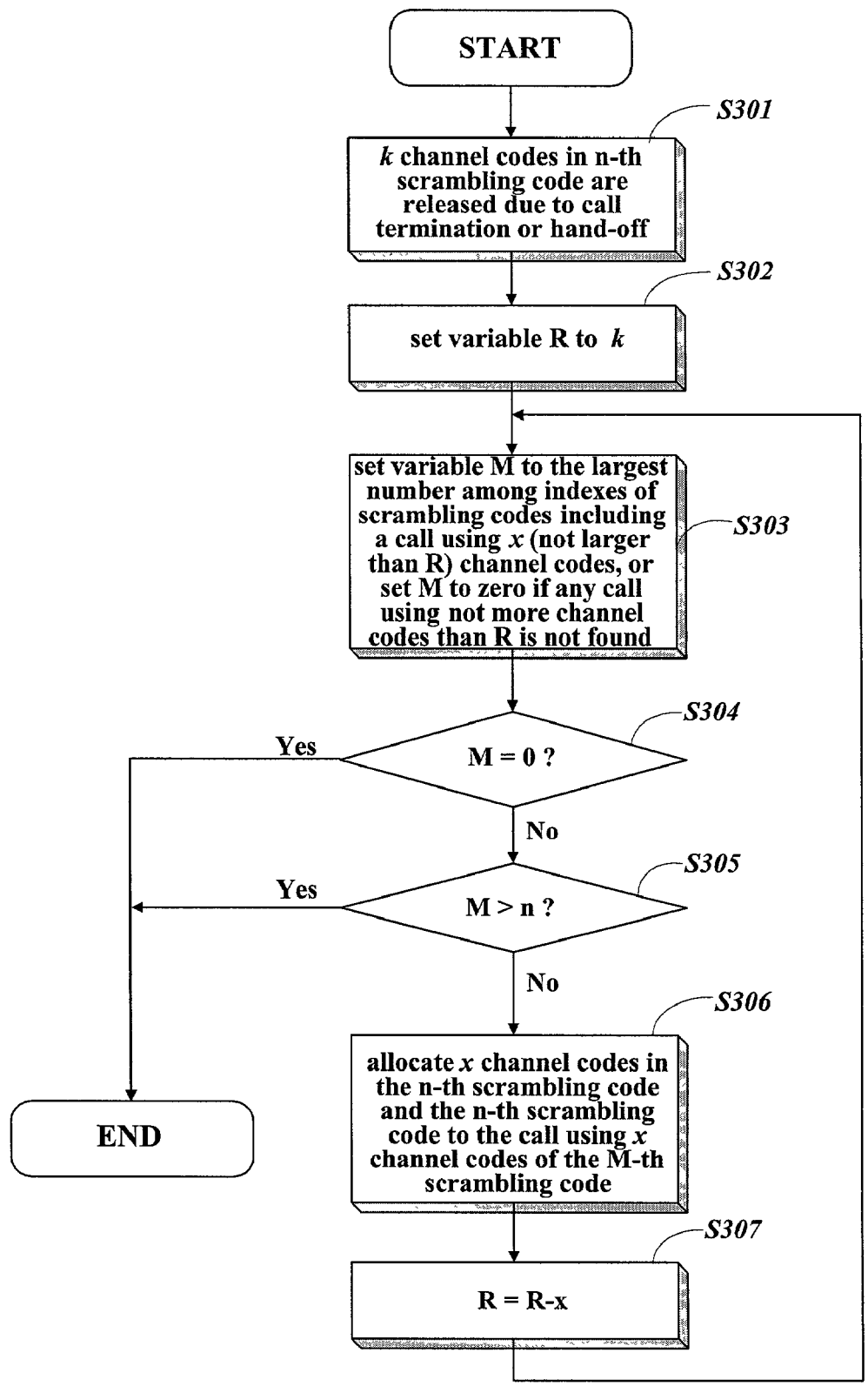
FIG. 3 is a flow chart embodying another channel code allocating method, which is for call release or call hand-off to another base station, according to the present invention.

FIGS. 2 and 3 are flow charts embodying a channel code allocating method according to the present invention where FIG. 2 is for a new call originated from a mobile station or a hand-off call from another base station, and FIG. 3 is for call release or call hand-off to another base station.

At first, an index i for using in selection of a scrambling code is initialized to 1, namely, i=1 (S201). When a call originated from a mobile station or handed-off from another base station is received (S202), a base station received the call checks whether as many channel codes as the call requested are in unallocated state in the i-th scrambling code (S203). If then, the base station allocates the unused channel codes in the i-th scrambling code to the mobile station having originated the call (S204).

If there is not so many channel codes as the call requested in the i-th scrambling code in the step S203, i is incremented by one, namely, i is updated to i+1 (S205). After increment of i, it is checked whether the incremented i exceeds the last index number N, namely i>N (S206). If i>N, it means that there is not any channel code to allocate to the call, so that the call is blocked forcibly (S207). Otherwise, the searching operation (S203) for unused channel codes is conducted again. If there are still no channel codes, the steps S205, S206 and S203 are repeated sequentially until as many channel codes as the call requested are found in the current i-th scrambling code or i exceeds the last index N. During this repetition, if unused channel codes are found, then they are allocated to the mobile station having originated the call (S204).

The embodiment of a channel code allocating method depicted in FIG. 2 in accordance with the present invention uses channel codes belonging to a scrambling code of smaller index as possible as it can. That is, if a call is arrived, a scrambling code of the smallest index is searched at first for unused channel codes to allocate, and if there are not so many unused channel codes as the call needs, an index variable for a scrambling code is incremented and then it is searched for. These operations keep going on while trying to find necessary unused channel codes. According to this channel code allocating method, scrambling codes are fully used one by one.

Described below in detail is the embodiment of FIG. 3, applied to call releasing or handing-off to another base station, according to the present invention.

If a call using n-th scrambling code and its k channel codes is released (S301), an internal variable R is set to the number k of the channel codes the released call has used, namely, R is set to k (S302). Next, all calls using x, not larger than R, channel codes at present are searched for, and a variable M is set to the largest number among indexes of scrambling codes including the channel codes the found calls are using. M is set to zero if any call using not more channel codes than R is not found (S303).

After that, it is checked whether M whose value has been set in the step S303 is zero or not (S304), then, if M is not zero, M is compared with n which is index of the scrambling code the released call has used (S305). If M is equal to or smaller than n, this channel code allocating procedure is terminated, otherwise, the call using x channel codes of the M-th scrambling code is re-allocated with x channel codes in the n-th scrambling code and the n-th scrambling code (S306) whose k channel codes have become unused due to the call release. Then, R is updated to R−x (S307) and the steps from S303 are repeated. This repeated operations of the steps S303 to S307 re-allocate in turn the k channel codes returned from the call release to other active calls using channel codes of different scrambling codes whose index is larger than n.

In the meantime, traffic channel re-establishing procedure may be conducted, if necessary, between an active mobile station and a base station when re-allocating the released channel codes.

The embodiment of a channel code allocating method depicted in FIG. 3 in accordance with the present invention re-allocates channel codes released from call termination or hand-off to other active calls whose scrambling codes have larger indexes than the scrambling code the terminated or handed-off call has used. According to this channel code re-allocating method, scrambling codes of smaller indexes are always used fully as possible as they can.

To maximize usage of channel codes in scrambling codes of smaller indexes, channel codes should be countable. In the present invention, channel codes are counted on a basis that a channel code of the largest spreading factor is 1. In addition, since OVSF code is used as channel code, the count of channel codes should not be against the OVSF code applying rules.

The above-explained channel code allocating method, applicable to synchronous uplink scheme of CDMA mobile system, according to the present invention, makes full use of channel codes in one scrambling code as possible as it can, before using ones in next scrambling code in the condition of usage of multiple scrambling codes. Therefore, orthogonality between channels, which reduces interferences between channels, is enhanced much more so that the performance of resources in communication system is also improved remarkably.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of allocating channel codes of a plurality of scrambling codes in synchronous uplink scheme of mobile communication system, comprising the steps of:

checking the number of channel codes and a scrambling code used by a released call;

searching for active calls using another scrambling code posterior to the scrambling code the released call has used and not more channel codes than the number of the channel codes the released call has used; and re-allocating the channel codes and the scrambling code used by the released call to at least one active call found in said seaching step.

2. The method set forth in claim 1, wherein said re-allocating step re-allocates the channel codes the released call has used to a plurality of active calls if the number of channel codes the plurality of active calls if the number of channel codes the plurality of active calls are using is not larger than that of the released channel codes.

3. The method set forth in claim 1, wherein the released call includes a call handed-off to other resource.

4. The method set forth in claim 1, wherein said re-allocating step conducts the code re-allocation through traffic channel re-establishing procedure between a mobile station and a base station.

5. The method set forth in claim 1, wherein said re-allocating steep re-allocates all or a part of channel codes the released call has used to an active call using a hindmost scrambling code first among calls found in said searching step.

* * * * *